US009670704B2

(12) United States Patent
Huston et al.

(10) Patent No.: US 9,670,704 B2
(45) Date of Patent: Jun. 6, 2017

(54) FULL WIDTH TAILGATE RELEASE HANDLE

(71) Applicant: Club Car, LLC, Evans, GA (US)

(72) Inventors: Steven Paul Huston, Evans, GA (US); Roy L. Woodard, Jr., Statesboro, GA (US)

(73) Assignee: Club Car, LLC, Evans, GA (US)

( * ) Notice: Subject to any disclaimer, the term of this patent is extended or adjusted under 35 U.S.C. 154(b) by 0 days.

(21) Appl. No.: 14/731,269

(22) Filed: Jun. 4, 2015

(65) Prior Publication Data

US 2015/0354254 A1    Dec. 10, 2015

Related U.S. Application Data

(60) Provisional application No. 62/008,079, filed on Jun. 5, 2014.

(51) Int. Cl.
*B62D 33/037* (2006.01)
*E05B 85/18* (2014.01)

(52) U.S. Cl.
CPC ............ *E05B 85/18* (2013.01); *B62D 33/037* (2013.01)

(58) Field of Classification Search
CPC ................................ E05B 85/18; B62D 33/037
USPC ........................................................ 296/57.1
See application file for complete search history.

(56) References Cited

U.S. PATENT DOCUMENTS

| 2,288,926 | A | 7/1942 | Strader |
| 3,272,552 | A | 9/1966 | Park |
| 3,437,376 | A | 4/1969 | Keathly |
| 4,358,150 | A | 11/1982 | Nash |
| 4,678,212 | A | 7/1987 | Rubio |
| 5,997,067 | A | 12/1999 | Shambeau et al. |
| 2003/0025348 | A1 | 2/2003 | Bobbitt, III et al. |
| 2005/0206173 | A1 | 9/2005 | Lim |
| 2006/0226672 | A1 | 10/2006 | Ruhlander |
| 2007/0284903 | A1 | 12/2007 | Waldner et al. |
| 2015/0102624 | A1* | 4/2015 | Kmita ........................ B60R 9/06 296/37.6 |

FOREIGN PATENT DOCUMENTS

EP        0054825 A1    12/1981

OTHER PUBLICATIONS

European Search Report, 15170433.5, Nov. 2, 2015, 9 pages.

* cited by examiner

*Primary Examiner* — Pinel Romain
(74) *Attorney, Agent, or Firm* — Taft Stettinius & Hollister LLP

(57) ABSTRACT

A full width tailgate release handle is pivotably connected to tailgate and extends substantially along the entire width of the tailgate for a cargo bed or the like. The full width tailgate release handle provides access for an operator to open the tailgate at any location along the width of the tailgate.

20 Claims, 5 Drawing Sheets

FULL WIDTH TAILGATE RELEASE HANDLE

TECHNICAL FIELD

The present invention generally relates to a tailgate release handle, and more particularly, but not exclusively, to a tailgate release handle extending substantially across the full width of a tailgate.

BACKGROUND

Tailgates for cargo beds have release handles to permit the tailgate to be unlatched and lowered so as to ease loading of cargo into the cargo bed. Some existing systems have various shortcomings relative to certain applications. Accordingly, there remains a need for further contributions in this area of technology.

SUMMARY

One embodiment of the present application includes a unique tailgate release handle that extends substantially across the entire width of the tailgate. Other embodiments include apparatuses, systems, devices, hardware, methods, and combinations for utilizing a full width tailgate release handle for a cargo bed on a vehicle. Further embodiments, forms, features, aspects, benefits, and advantages of the present application shall become apparent from the description and figures provided herewith.

DETAILED DESCRIPTION OF THE ILLUSTRATIVE EMBODIMENTS

Figure 1:
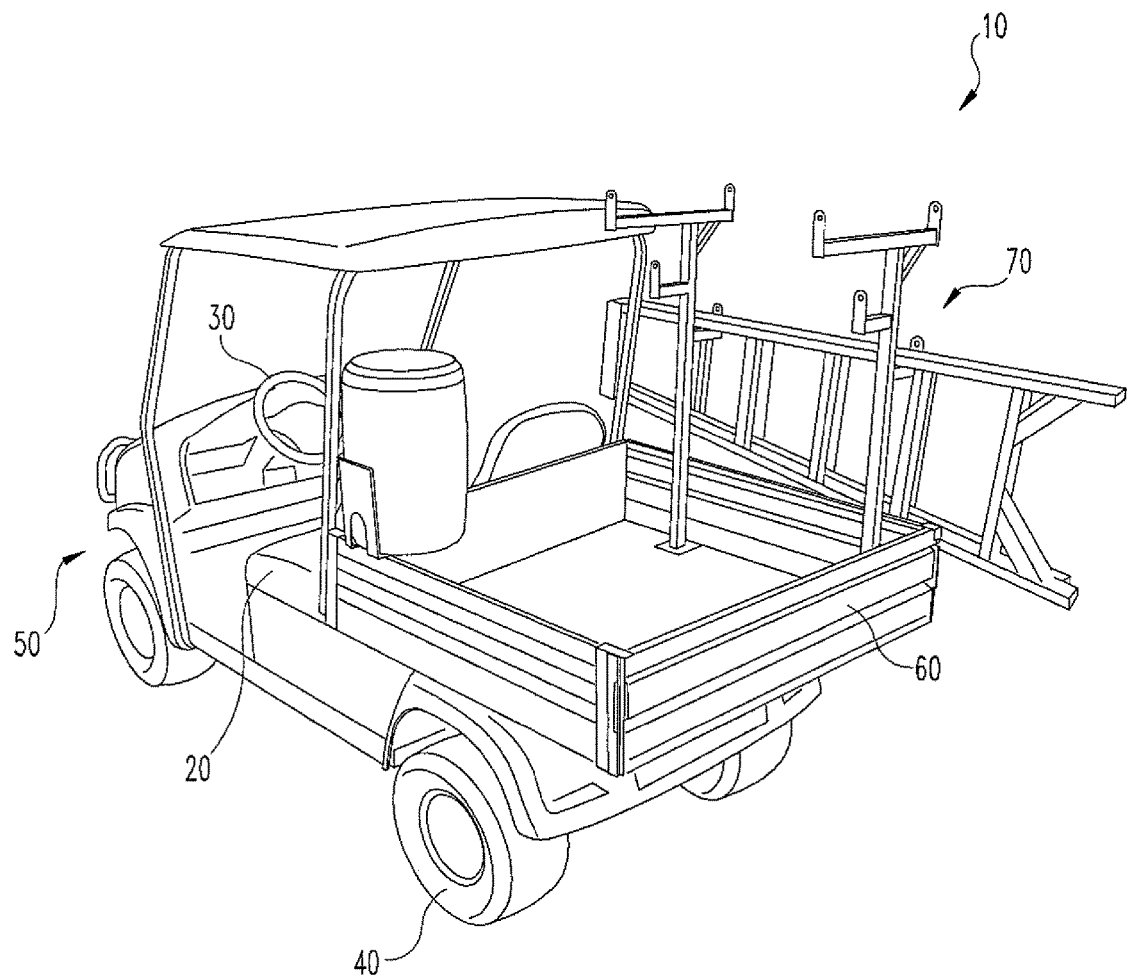
FIG. 1 is a perspective view of a utility vehicle operable for carrying and transporting cargo in a cargo bed.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Referring now to FIG. 1, a perspective view of a utility vehicle 10 is shown to illustrate one aspect of the present disclosure. The utility vehicle 10 can include any number of features that are typical of motorized utility vehicles such as a driver's seat 20, a steering wheel 30, and a plurality of wheels 40 operable to maneuver the vehicle 10 over ground or manmade surfaces. In some embodiments the vehicle can include three wheels and in other embodiments four or more wheels can be utilized as desired. A power source 50 can provide motive power to propel the vehicle in forward or aft directions. Power source 50 can include one or more electric motors and/or internal combustion engines powered by a variety of fuels such as petroleum based products including gasoline, natural gas and propane or the like. The vehicle 10 can include a cargo bed 60 for holding cargo 70 such as ladders, tools and other items as illustrated in the exemplary embodiment, however, it should be understood that the teachings of the present disclosure can be utilized with any type of cargo bed and vehicle combination as will be understood upon review of the present disclosure. For example, any vehicle having a cargo bed such as pick-up trucks, dump trucks, trailers, or other cargo carrying transportation apparatuses can advantageously incorporate the teachings herein.

Figure 2:
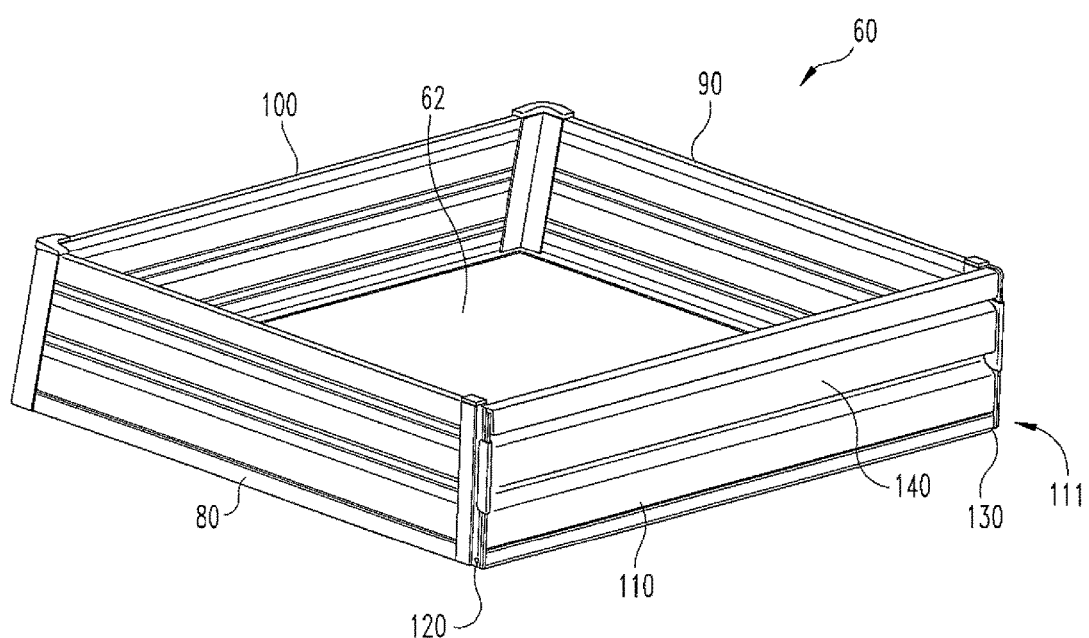
FIG. 2 is a perspective view of an exemplary cargo bed according to one aspect of the present disclosure.

Referring now to FIG. 2, a perspective view of an illustrative embodiment of the cargo bed 60 is depicted. The cargo bed 60 can include a support base 62 for supporting cargo (not shown). The shape of the support base 62 can be substantially square as illustrated, or can be defined by other forms or shapes as desired such as a rectangular structure as is conventional. The cargo bed 60 can include a first side wall 80 and a second side wall 90 positioned on opposing sides of the support base 62. A forward wall 100 can extend between the first and second side walls 80, 90 to form a separator wall between the driver's seat 20 (see FIG. 1) and the cargo bed 60. A tailgate 110 can be configured to extend across a width of the cargo bed 60 and is positioned between the first and second side walls 80, 90 along an aft portion 111 of the cargo bed 60. The tailgate 110 extends from a first end 120 to a second end 130 to define a substantially full width of the cargo bed 60 along the aft portion 111. A full width tailgate release handle 140 is pivotably connected to the tailgate 110 and extends substantially along the entire width of the tailgate 110 between the first end 120 and second end 130. The full width tailgate release handle 140 permits an operator to grip anywhere along the entire width of the release handle and manually actuate to unlatch the tailgate 110 from the sidewalls 80, 90 of the cargo bed 60. This operation will be described in further detail below.

Figure 3:
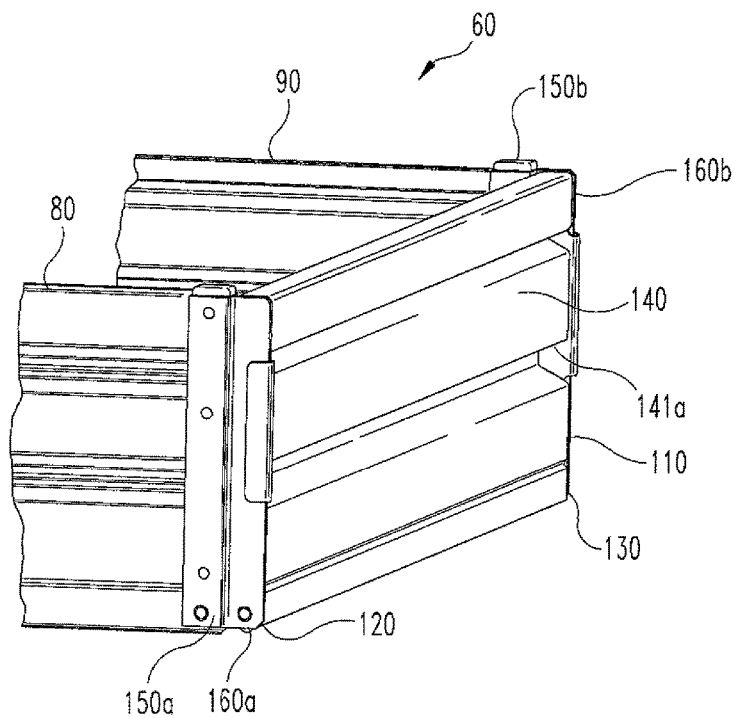
FIG. 3 is a perspective view of a portion of the cargo bed of FIG. 2 wherein a full width tailgate release handle is shown in a closed position.

Referring now to FIG. 3, a portion of the cargo bed 60 is illustrated wherein the tailgate 110 is in a closed position and the tailgate handle 140 is shown in a closed position 141a. A first sidewall latch bracket 150a can be connected to one end of the first sidewall 80 and a second sidewall latch bracket 150b can be connected to one end of the second sidewall 90. A first tailgate latch bracket 160a can be attached to the tailgate 110 proximate the first end 120 of the tailgate 110 and a second tailgate latch bracket 160b can be operably connected to the tailgate 110 proximate the second end 130 of the tailgate 110. Although not shown in this view, the sidewall and tailgate latch brackets can house various components and mechanisms for releasably latching the tailgate 110 to the sidewalls 80, 90.

Figure 4:
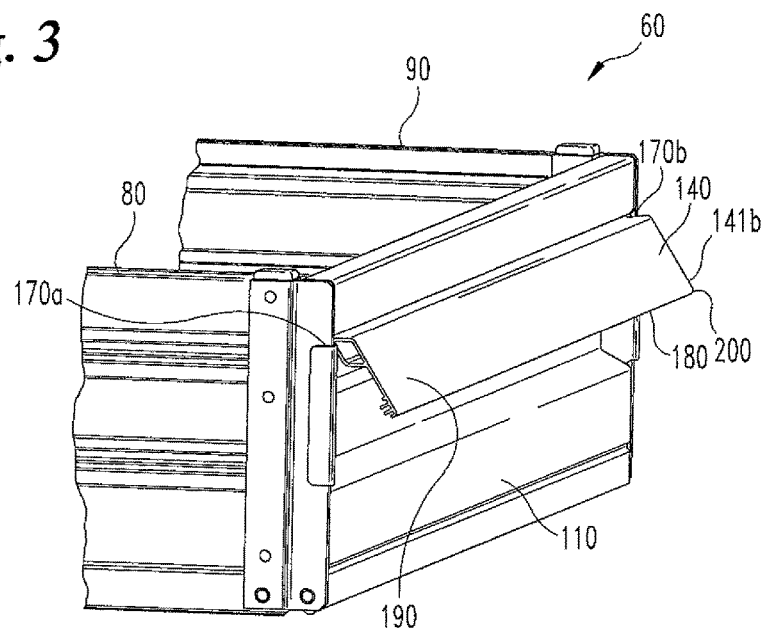
FIG. 4 is a perspective view of a portion of the cargo bed of FIG. 2 wherein a full width tailgate release handle is shown in an open position.

Referring now to FIG. 4, the full width tailgate release handle 140 is shown in an open position 141b when the full width handle 140 is pivoted about handle pivot joints 170a, 170b at either end to release the tailgate 110 from a latched position. A grip portion 180 extends along the entire width of the full width tailgate release handle 140 between a first end 190 and a second end 200 as illustrated. The grip portion 180 extends across substantially the entire width of the tailgate 110 to permit an operator to grip any portion of the tailgate release handle 140 along the defined width to pivotably actuate the tailgate release handle 140 between the open and closed positions 141b, 141a, respectively. It should be understood that while two pivot locations 170, 170b are called out in the disclosed embodiment, that other alternate configurations are also contemplated. For example the pivot joint for the full width tailgate release handle 140 can include a single elongate pin joint extending substantially along the full width of the tailgate or can include multiple discreet pivot joints between the first and second ends 120, 130 of the tailgate 110.

Figure 5:
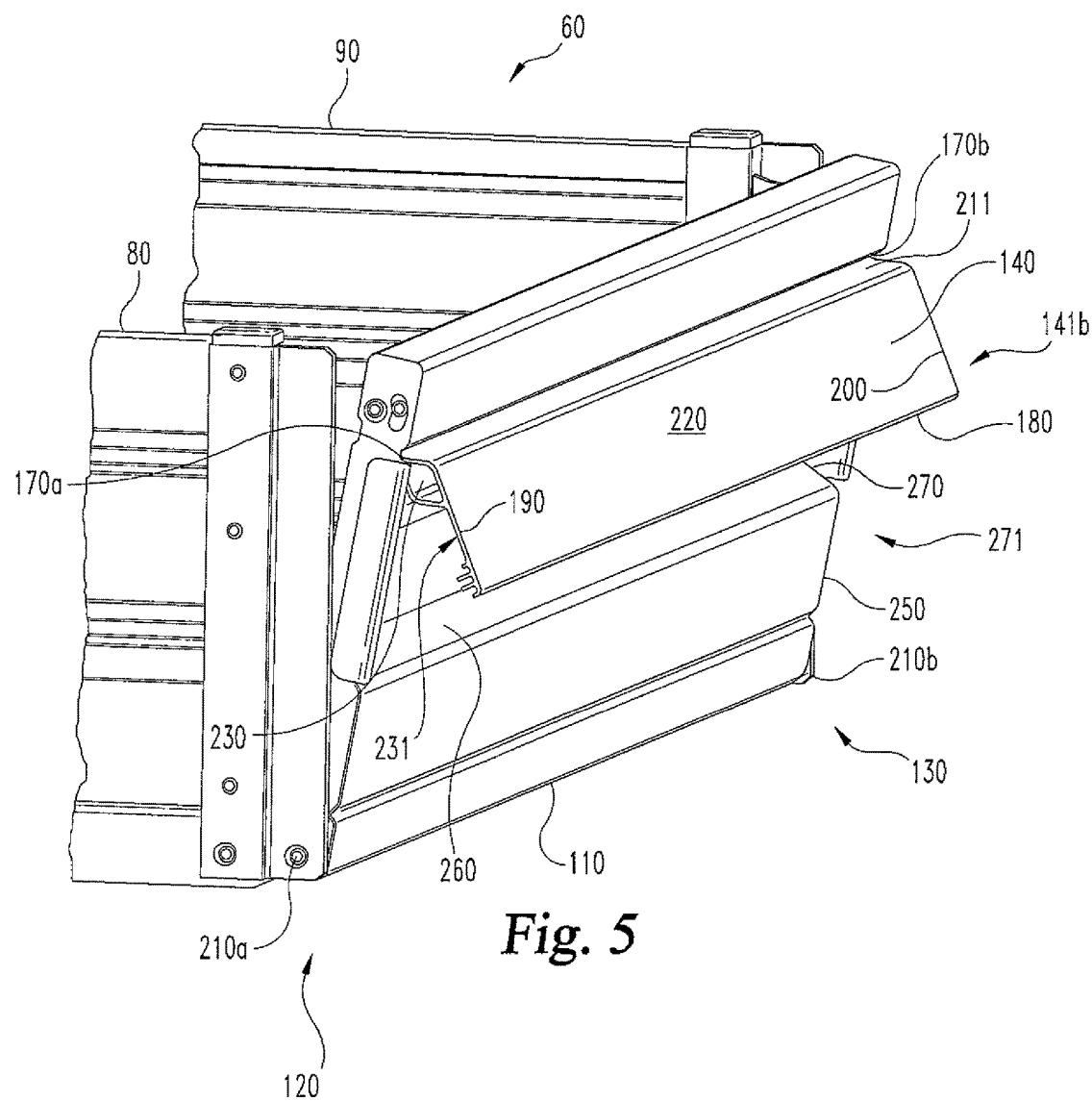
FIG. 5 is a perspective view of a portion of the cargo bed of FIG. 2 wherein the tailgate is partially open and the tailgate release handle is in an open position.

Referring now to FIG. 5, the tailgate 110 is illustrated in a partially open position relative to the cargo bed 60. The full width release handle 140 is moved to the open position 141b which unlatches the tailgate 110 and permits the tailgate 110 to pivot about tailgate pivots 210a, 210b to a fully lowered position such that cargo can be more easily loaded or unloaded from the cargo bed 60.

The full width handle 140 can include a top portion 211 that extends angularly away from the tailgate 110 to a forward face 220. The forward face 220 extends downward towards the grip portion 180 at the lower end thereof. The tailgate 110 can include a lower panel 250 that extends to an inwardly tapering wall 260 toward a recessed area 270 formed within an outer wall 271 of the tailgate 110 to permit the full width release handle 140 to nest therein when located in a closed position 141a (best seen in FIG. 3). The tailgate 110 can further include a structural bar 230 extending from the top portion 211 to the forward face 220 on the underside 231 of the full width handle 140. The structural bar 230 can provide increased structural strength and rigidity of the full width handle 140 such that a torque load produced by opening a full width handle 140 from the grip portion 180 by pivotably rotating the full width handle 140 about the handle pivot 170 does not cause material deflection or permanent yielding.

Figure 6:
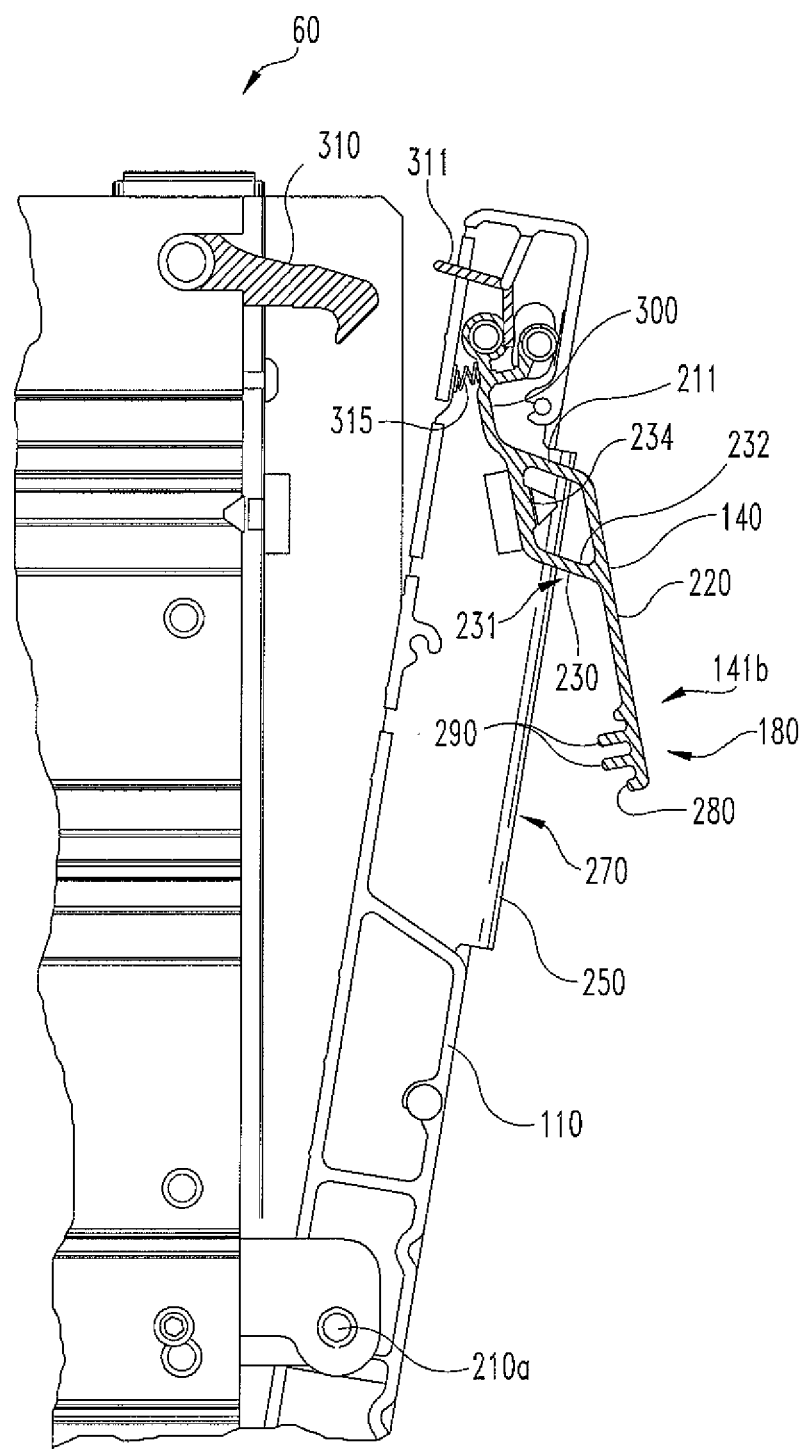
FIG. 6 is a side view of a portion of the cargo bed of FIG. 5.

Referring now to FIG. 6, a side view of a portion of the cargo bed 60 is illustrated. The tailgate 110 is unlatched and is partially opened as the tailgate 110 has been pivoted clockwise about the tailgate pivots 210a, 210b. The tailgate release handle 140 is also shown in the open position 141b. The tailgate release handle 140 can be moved to the open position 141b by gripping the grip portion 180 and pulling outward away from the tailgate 110.

A gripping member 280 can be formed as an extension projecting from the grip portion 180 toward the cargo bed 60. The grip member 280 may be constructed to provide a feature, surface finish or a material coating that increases the ability of an operator to obtain a solid non-slip grip while applying an actuation torque to the full width release handle 140.

The forward face 220 of the full width release handle 140 extends from the grip portion 180 to the top portion 211. A lever portion 300 extends from the top portion 211 and is operable to release the tailgate 110 from a latch 310 when the release handle 140 is moved to the open position 141b. A latch connector 311 connected to the release handle 140 is lockingly engaged with the latch 310 when the tailgate 110 and the tailgate release handle 140 are both in their closed positions. When the tailgate release handle 140 is opened the latch connector 311 is released from the latch 310 to permit the tailgate to be opened. In some embodiments a bias member 315 such as a spring or the like may be constructed and arranged to provide a closing bias force to the tailgate release handle 140.

The tailgate recessed area 270 can receive the full width release handle 140 such that the forward face 220 is substantially flush with the lower panel 250 of the tailgate 110 when located in the closed position 141a (best seen in FIG. 3). In other forms the forward face 220 may not be substantially flush with portions of the tailgate 110. The structural bar 230 as illustrated can include a first portion 232 extending inward from the underside 231 of the forward face 220 and a second portion 234 that angles upward toward the top portion 211 of the full width handle 140.

The tailgate release handle 140 can include one or more protruding members 290 proximate the grip portion 180 that extend inward from the underside 231 of the forward face 220 toward the recessed area 270 of the tailgate 110. In some embodiments, the protruding members 290 can be operable for providing an abutment such that tailgate release handle 140 may rest against portions of the recessed area 270. A space between the grip portion 180 and the recessed surface area 270 can be defined to permit access for an operator to grip the grip member 280 anywhere along the width of the full width release handle 140.

In operation an operator can open the tailgate release handle 140 from any position along the entire width of the tailgate 110. For example, a person standing adjacent the first end 120 of the tailgate 110 can grip the gripping portion 180 adjacent the first end 190 of the tailgate release handle 140 and open the tailgate. Alternatively a person can be positioned on the other side of the cargo bed 60 at the second end 130 adjacent the second sidewall 90 and can grip the tailgate release handle 140 adjacent the second end 200 of the full width tailgate release handle 140 and open the tailgate from that position. Furthermore, the tailgate release handle 140 can be gripped and actuated from a closed position to an open position at any location along the entire width thereof between the first position 190 and the second position 200 of the full width release handle 140. In this manner, the full width release handle 140 provides utility for an operator by permitting release of the tailgate at any location along the width thereof.

In one aspect the present disclosure includes an apparatus comprising a cargo bed extending between first and second side walls; a tailgate having first and second ends defining a width thereof, the tailgate pivotably connected to the cargo bed between the first and second sidewalls; and a tailgate release handle having a width extending substantially across the entire width of the tailgate, the tailgate release handle being pivotably connected to the tailgate between open and closed position.

In refining aspects the tailgate release handle is accessible from any position along the width of the tailgate; the tailgate release handle is operably coupled to a latch mechanism; the latch mechanism includes a latch operably coupled to the cargo bed; and a latch connector operably coupled to the tailgate release handle; the tailgate release handle pivots the latch connector away from the latch when moved from the closed to the open position; the latch mechanism includes a latch connector proximate either end of the tailgate release handle; the tailgate release handle includes a first pivot proximate the first end of the tailgate and a second pivot proximate the second end of the tailgate; the tailgate includes a recessed area in an outer wall extending substantially across the entire width thereof; the tailgate release handle is constructed to at least partially nest within the recess area of the tailgate when in the closed position; the tailgate release handle includes a protruding member extending from an inner wall towards the tailgate; the protruding member is engageable with the tailgate within the recessed area when the release handle is in the closed position; the tailgate release handle includes a grip portion;

a angled top portion extending from the grip portion; a lever portion extending from the top portion opposite of the grip portion; and a support bar extending from an underside of the top portion to an underside of the grip portion; the apparatus further comprising a hollow portion formed between the support bar and the grip portion along the width of the tailgate release handle; the grip portion includes a gripping member extending towards the tailgate at a desired length; a length of the gripping member is defined to be spaced apart from the tailgate when the tailgate release handle is in the closed position; the apparatus further comprising a bias member constructed to urge the tailgate release handle toward the closed position.

In another aspect the present disclosure includes a vehicle comprising a chassis; a plurality of wheels operably connected to the chassis; a cargo bed having a platform base and a pair of sidewalls extending from opposing sides thereof; a forward wall extending between the pair of side walls at one end of the cargo bed; a tailgate positioned at an opposing end of the cargo bed, the tailgate having a width defined by the distance between the side walls; and a full width tailgate release handle extending substantially along the entire width of the tailgate between the opposing sides of the cargo bed, the tailgate release handle being pivotably connected to the tailgate between open and closed positions.

In refining aspects, the tailgate release handle includes a first pivot joint positioned proximate one side of the cargo bed and a second pivot joint positioned proximate the other side of the cargo bed. the tailgate release handle is accessible from any position along the width of the tailgate; and the apparatus further comprising a motive source for providing rotational torque to the wheels.

In another aspect a method includes pivotably connecting a tailgate release handle to a tailgate having a width extending between first and second sidewalls of a cargo bed, wherein the tailgate release handle extends along substantially the entire width of the tailgate; gripping the tailgate release handle at any location along the width of the tailgate; and moving the tailgate release handle from a closed position to an open position to unlatch the tailgate from the cargo bed.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. An apparatus comprising:
    a cargo bed extending between first and second side walls;
    a tailgate having first and second ends defining a width thereof between the first and second sidewalls of the bed, the tailgate pivotably connected to the cargo bed between the first and second sidewalls;
    a tailgate release handle having a handle width extending substantially across the width of the tailgate proximate the first and second ends, the tailgate release handle being pivotably connected to the tailgate between open and closed positions; and
    wherein the tailgate release handle is operably coupled to a latch mechanism across the entire width of the tailgate.

2. The apparatus of claim 1, wherein the tailgate release handle is accessible from any position along the width of the tailgate.

3. The apparatus of claim 1, wherein the tailgate release handle includes a first pivot proximate the first end of the tailgate and a second pivot proximate the second end of the tailgate.

4. The apparatus of claim 1, wherein the tailgate includes a recessed area in an outer wall extending substantially across the entire width thereof.

5. The apparatus of claim 4, wherein the tailgate release handle is constructed to at least partially nest within the recess area of the tailgate when in the closed position.

6. The apparatus of claim 1, wherein the tailgate release handle includes a protruding member extending from an inner wall towards the tailgate.

7. The apparatus of claim 6, wherein the protruding member is engageable with the tailgate within the recessed area when the release handle is in the closed position.

8. The apparatus of claim 1, wherein the tailgate release handle includes:
    a grip portion;
    an angled top portion extending from the grip portion;
    a lever portion extending from the top portion opposite of the grip portion; and
    a support bar extending from an underside of the top portion to an underside of the grip portion.

9. The apparatus of claim 8 further comprising a hollow portion formed between the support bar and the grip portion along the width of the tailgate release handle.

10. The apparatus of claim 8, wherein the grip portion includes a gripping member extending towards the tailgate at a desired length.

11. The apparatus of claim 10, wherein a length of the gripping member is defined to be spaced apart from the tailgate when the tailgate release handle is in the closed position.

12. The apparatus of claim 1 further comprising a bias member constructed to urge the tailgate release handle toward the closed position.

13. The apparatus of claim 1, wherein the latch mechanism includes:
    a latch operably coupled to the cargo bed; and
    a latch connector operably coupled to the tailgate release handle.

14. The apparatus of claim 13, wherein the tailgate release handle pivots the latch connector away from the latch when moved from the closed to the open position.

15. The apparatus of claim 13, wherein the latch mechanism includes a latch connector proximate either end of the tailgate release handle.

16. A vehicle comprising:
a chassis;
a plurality of wheels operably connected to the chassis;
a cargo bed having a platform base and a pair of sidewalls extending from opposing sides thereof;
a forward wall extending between the pair of side walls at one end of the cargo bed;
a tailgate positioned at an opposing end of the cargo bed, the tailgate having an entire width defined by the distance between the side walls;
a full width tailgate release handle extending substantially along the entire width of the tailgate between the opposing sides of the cargo bed, the tailgate release handle being pivotably connected to the tailgate between open and closed positions; and
wherein the tailgate release handle is operably coupled to a latch mechanism across substantially the entire width of the tailgate.

17. The vehicle of claim 16, wherein the tailgate release handle includes a first pivot joint positioned proximate one side of the cargo bed and a second pivot joint positioned proximate the other side of the cargo bed.

18. The vehicle of claim 16, wherein the tailgate release handle is accessible from any position along the width of the tailgate.

19. The vehicle of claim 16 further comprising a motive source for providing rotational torque to the wheels.

20. A method comprising:
pivotably connecting a tailgate release handle to a tailgate having a width extending between first and second sidewalls of a cargo bed to define an entire width of the tailgate;
pivoting the tailgate release handle from a closed position to an open position to unlatch the tailgate from the cargo bed, wherein the tailgate release handle extends along substantially the entire width of the tailgate.

* * * * *